US005101768A

United States Patent [19]

Cates

[11] Patent Number: 5,101,768

[45] Date of Patent: Apr. 7, 1992

[54] TORSO HARNESS

[76] Inventor: Charles Cates, P.O. Box 6596, Bozeman, Montana 6595

[21] Appl. No.: 230,891

[22] Filed: Aug. 11, 1988

[51] Int. Cl.⁵ ........................ A01K 29/00; A61G 1/00

[52] U.S. Cl. ........................ 119/96; 294/140; 224/160

[58] Field of Search ........................ 119/96, 29; 128/869-876, 846; 2/44, 45; 182/3, 4; 224/257, 258, 259, 160; 244/151 R; 272/70 A; 294/140; 297/484, 464, 467, 468, 483

[56] References Cited

U.S. PATENT DOCUMENTS

| | | | |
|---|---|---|---|
| 1,518,830 | 12/1924 | Woods | 224/160 |
| 2,407,714 | 9/1946 | Maloney | 224/160 |
| 4,327,852 | 5/1982 | Gibson | 224/209 |
| 4,487,346 | 12/1984 | Fischer | 224/160 |
| 4,560,097 | 12/1985 | Reynolds et al. | 224/160 |
| 4,712,513 | 12/1987 | Huppertsberg | 244/151 R |

FOREIGN PATENT DOCUMENTS

| | | | |
|---|---|---|---|
| 1011731 | 7/1957 | Fed. Rep. of Germany | 224/160 |

*Primary Examiner*—John G. Weiss
*Attorney, Agent, or Firm*—Paul J. Cook

[57] ABSTRACT

An adjustable torso harness strap is provided with a quick-release snap buckle and a two-segment adjustable chest strap having a quick-release snap buckle. One segment of the chest strap is permanently secured to the torso harness strap. The second segment of the chest strap is slideably secured to the torso harness strap. The strap is worn by one individual rescuer to assist in the physical evacuation of one individual rescuee by positioning the portion of the harness strap above the chest strap over the shoulders of the rescuer and around the back of the rescuee. The portion of the harness strap below the chest strap is positioned under the shoulders of the rescuer and around the back of the upper-portion of the legs of the rescuee. The chest strap is positioned across the chest of the rescuer.

4 Claims, 3 Drawing Sheets

TORSO HARNESS

BACKGROUND OF THE INVENTION

The present invention relates to a first-aid, first responder field support equipment device, and more particularly to an adjustable torso harness strap having an adjustable chest strap which permits carrying a rescuee on the back of a rescuer.

Presently available means for field rescue for the physical evacuation of a rescuee comprise the hand-held carrying devices such as the litter and backboard. They are two similar devices that differ in design preference, but otherwise have the same evacuation function.

The use of the litter and/or backboard requires two to four rescuers to physically evacuate the rescuee. When two rescuers evacuate the rescuee with a litter and/or backboard, they must use both hands, while four rescuers must use one hand each in carrying the litter and/or backboard. Both groupings of rescuers are slightly off balance and the cadence of their foot movement, a very important time factor, which is usually not synchronized, creates erratic and slowed movement.

This mode of physical evacuation has further restrictions. There has to be a reasonable corridor of space to accommodate at least three persons abreast in the case of a four rescuer litter evacuation team. In addition, a reasonable corridor of turning space is required for proper evacuation. Even though the rescuee is usually strapped or secured to the hand-held carrying device, this evacuation device deems that the turn be negotiated with due concern. Any miscalculation can result in the tipping over of the rescuee and/or dropping of the hand-held carrying device.

It has been proposed in U.S. Pat. No. 1,518,830 to provide a harness for carrying a rescuee by one rescuer which permits carrying of the rescuee on the back of the rescuer. The harness includes shoulder straps which are positioned over the shoulder of both the rescuer and rescuee. In this harness design the only means for restraining the shoulder straps are the connection points to a belt portion of the harness design. Thus, when there is a shift of the weight of the rescuee, there is a high probability that a shoulder strap will slip from the shoulders of the rescuee and rescuer thereby causing a sudden large shift in the weight of the rescuee which may cause the rescuer to fall. Other harness designs are described in U.S. Pat. Nos. 652,352; 393,555 and 1,307,597.

It is an object of this invention to provide an effectively designed field support equipment device that can adequately assist a single rescuer, to singularly physically evacuate, with great efficiency, a rescuee, from an imminent danger zone.

It is a further object of this invention to provide an evacuation device, that enables the rescuer to have free use of his hands and arms.

It is a further object of this invention to provide an evacuation device which permits the rescuer to carry the rescuee while minimizing weight shift of the rescuee.

It is a further object of this invention to provide a device that is highly portable, lightweight, compact for storage, usable in any terrain or weather and which can be implemented by the rescuer onto the rescuee, regardless of body position of the rescuee.

SUMMARY OF THE INVENTION

The present invention comprises a harness having an adjustable torso harness strap and an adjustable chest strap. The chest strap is comprised of two segments. One segment on the chest strap is permanently secured to the torso harness strap, and the other segment of the chest strap is slideably mounted on the torso harness strap. The two segments of the chest strap are joinable by a quick-release snap buckle. Both the torso strap and the chest strap are adjustable in length so that they can fit to any particular body size of the rescuer and rescuee. The quick-release snap buckles on both the torso harness strap and the chest strap are positioned on the front area of the rescuer when the device is worn by the rescuer. In addition, a convenience retaining D-ring and an elastic retainer strap can be permanently secured to the torso harness as an article retainer.

DESCRIPTION OF SPECIFIC EMBODIMENTS

In accordance with this invention, a harness strap device is provided, which comprises an adjustable torso harness strap onto which is mounted an adjustable chest strap. One segment of the chest strap is permanently secured onto a section of the torso harness strap, while the other segment of the chest strap is slideably secured to a second section of the torso strap. The two chest strap segments are connected by means of a quick-release snap buckle, which also allows for the adjustment in the length of the chest strap. The chest strap segments, when connected, together with the torso strap form a loop through which the upper torsos of the rescuer and the rescuee can fit. Both the torso harness strap and chest strap are adjustable in length to accommodate the sizes of a specific rescuer and rescuee.

A closed convenience retaining ring, e.g., D or O shaped, can be permanently secured onto the torso harness strap, that is worn on the front of the rescuer. The D-shaped ring can be used to retain an article normally utilized by a rescuer, such as a first-aid pouch.

An elastic retainer strap can be slideably secured to the torso harness strap, should there be a need for retainment of excess harness strap after body adjustment is made.

Figure 3:
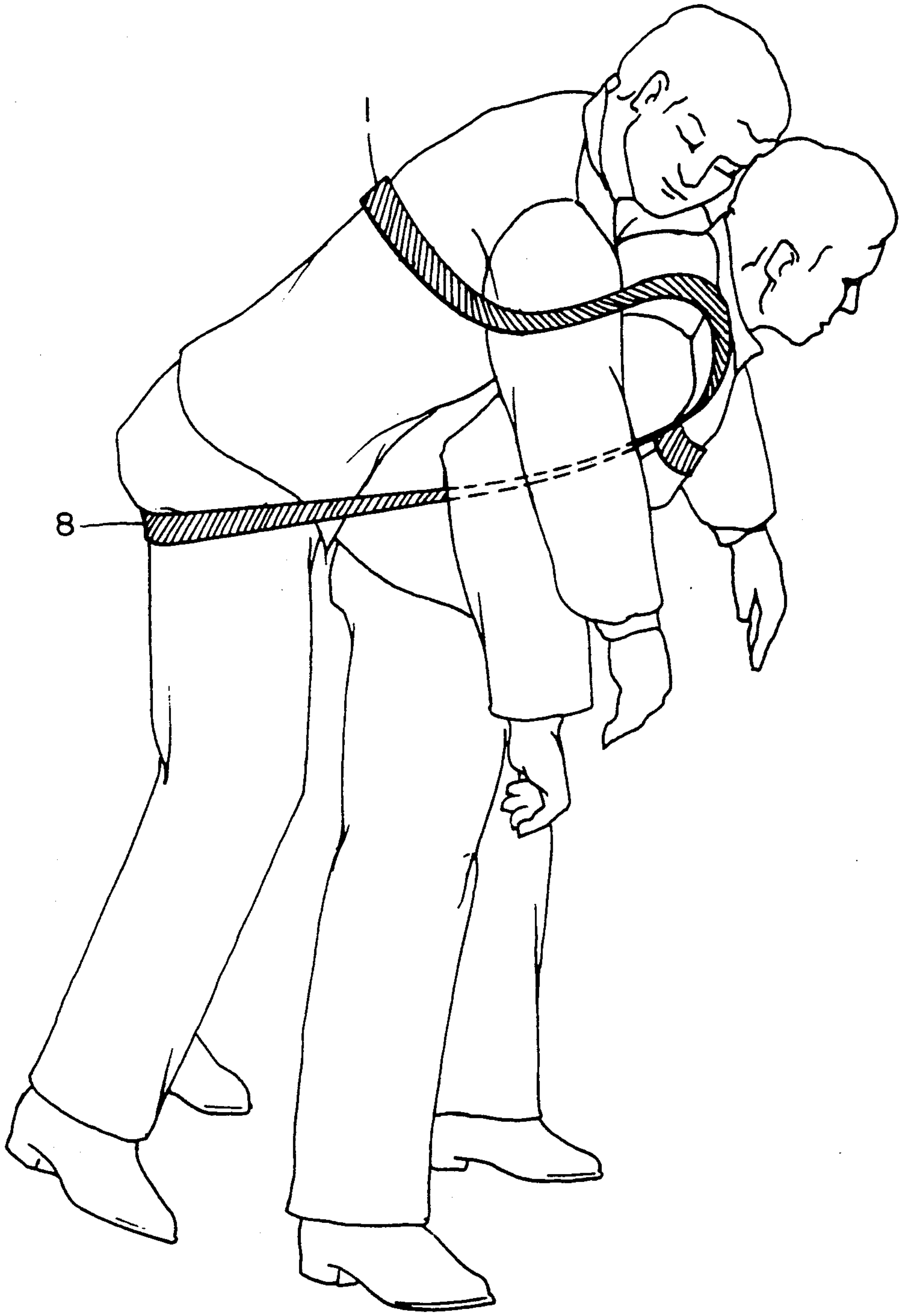
FIG. 3 is an illustration, side-view, of the rescuer and rescuee within the invention, ready for physical evacuation.

In use, the present invention is worn about the shoulder region of the upper torso of the rescuer. It extends itself to the rescuers backside, after going over the rescuers shoulders and passing under his arm pit region, the remainder of the device is then looped about the under arm region of the rescuee. The balance of the device is placed under the buttocks region of the rescuee. (See FIG. 3). The present invention utilizes the rescuer's body as a fulcrum for leverage, balance and weight distribution of the rescuee.

To compensate for body size differences, the torso harness strap is adjusted in length by either increasing or decreasing the amount of slack on the torso harness strap. The rescuer then adjusts the chest strap, thereby allowing the rescuee's body to rest snugly against the rescuer's body. The hands and the arms of the rescuer remain free for better movement, balance and possible required defensive action, such as a combat soldier returning rifle fire, to ensure his evacuation process.

Figure 1:
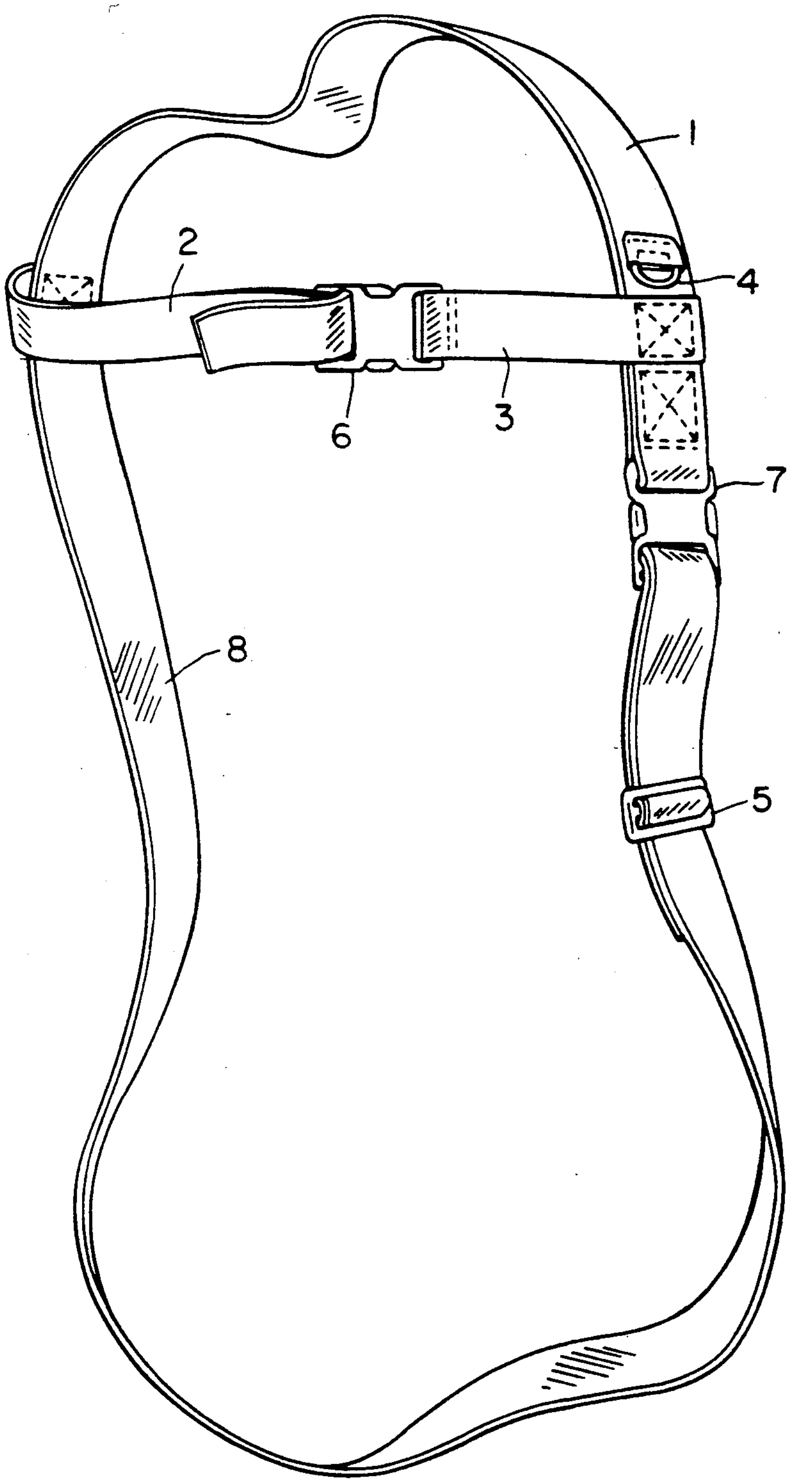
FIG. 1 is an isometric member of the system of the invention.
Figure 2:
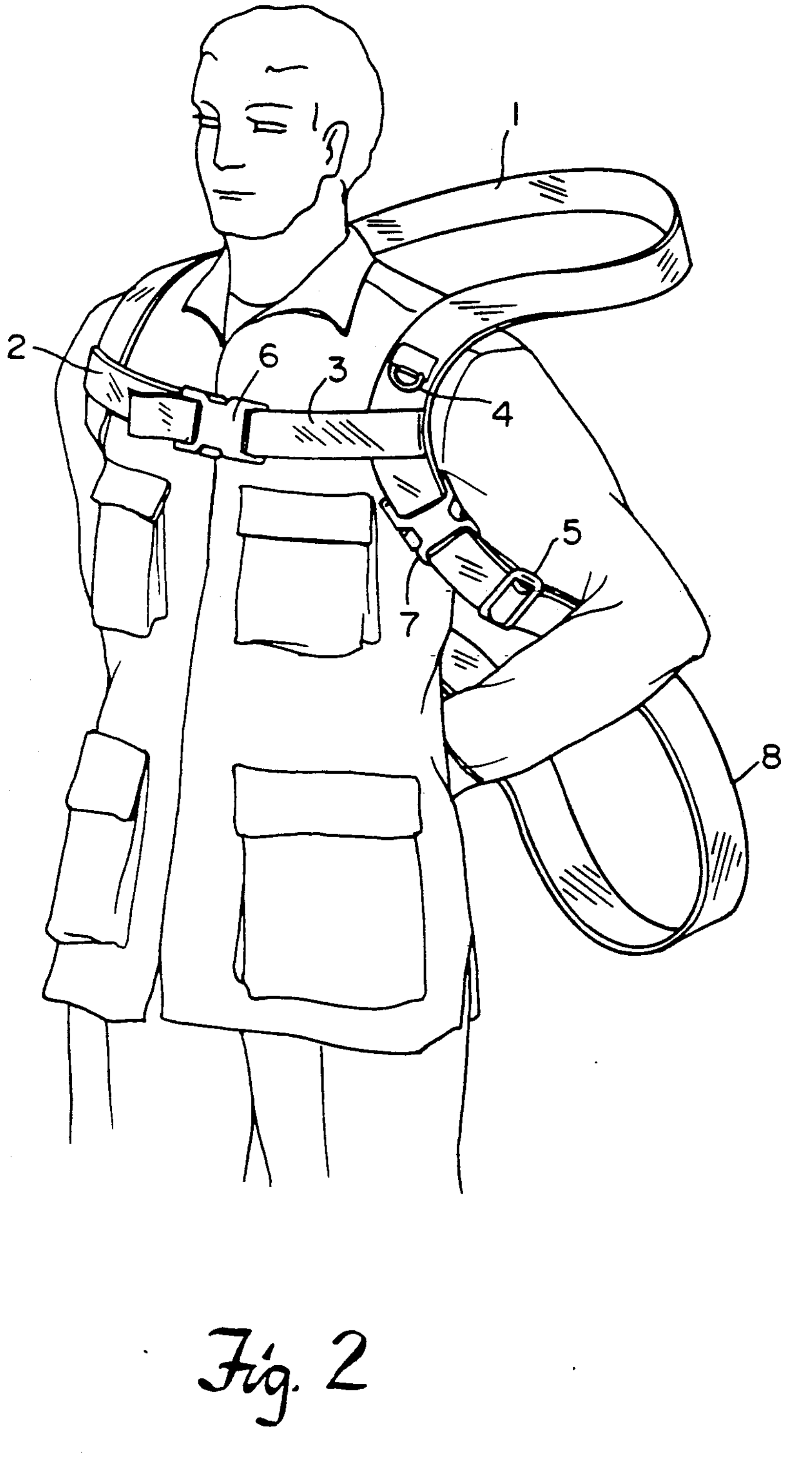
FIG. 2 is an illustration, three-quarter view, of the rescuer wearing the invention, without a rescuee in the invention.

Referring to FIG. 1, there is shown a harness device for an individual rescuer, which is capable of providing an assist factor for the physical evacuation of an individual rescuee, with greater efficiency factor.

A harness strap device comprises the torso harness strap 1 and a chest strap formed of two segments 2 and 3. A convenience retaining D-shaped ring 4 can be included. An elastic retainer strap 5 for retaining excess free length of the torso harness strap also can be provided. A quick-release snap buckle 6 is attached onto the two segment chest strap 2 and 3. A quick-release buckle 7 is attached to torso strap 1 in order to form an upper torso loop defined by torso harness strap 1 and chest strap segments 2 and 3 and a lower torso loop defined by torso harness strap segment 8 and chest strap segments 2 and 3 when the buckles 6 and 7 are closed.

The length of the chest strap formed of segments 2 and 3 is adjustable for wear, by either increasing or decreasing the amount of slack on the chest strap 2. The chest strap segments 2 and 3 can easily be put on or taken off by the rescuer by means of the quick-release snap buckle 6.

The convenience retaining D-shaped ring 4 can be permanently secured onto the harness 1, and can be used to retain an article, such as a first-aid kit.

The elastic retainer strap 5 is slideably secured to the harness 1, and is used for the retaining of the excess length of torso strap 1, should there be a need for retainment, after adjustment either by increasing or decreasing the amount of slack.

I claim:

1. A harness device consisting a torso harness strap having two ends joinable by a first buckle, a chest strap form of two chest strap segments, said chest strap segments being joinable by a second buckle, one of said chest strap segments being fixedly secured to said torso harness strap and a second of said chest strap segments being slideably mounted on said torso harness strap, one of said chest strap segments having an adjustable length, said torso harness strap having an adjustable length, said chest strap segments and said torso harness straps forming an upper torso loop and a lower torso loop when said buckles are closed, said upper torso loop having a size which permits said upper torso loop to fit tightly over the shoulders of a rescuer and under the arms and around the back of a rescuee, said lower torso loop having a size which permits said torso harness strap to fit tightly under the arms of the rescuer and around the arms of the rescuee.

2. The harness device of claim 1 which includes a closed retaining ring fixedly secured to said device.

3. The harness device of claim 1 which includes an elastic retainer strap slideably secured to said torso harness strap.

4. The harness device of claim 1 which includes an elastic retainer strap slideably secured to said torso harness strap and a closed retaining ring fixedly secured to said device.

* * * * *